United States Patent [19]
Gissane

[11] 4,121,202
[45] Oct. 17, 1978

[54] DISPLAY DEVICE HAVING VISIBLE PATTERN

[75] Inventor: William James Mason Gissane, Runcorn, England

[73] Assignee: Imperial Chemical Industries Limited, London, England

[21] Appl. No.: 735,123

[22] Filed: Oct. 22, 1976

[30] Foreign Application Priority Data

Oct. 31, 1975 [GB] United Kingdom .............. 45326/75

[51] Int. Cl.² .............................................. G06F 3/14
[52] U.S. Cl. ................................ 340/324 M; 350/332
[58] Field of Search ............. 340/324 M; 350/160 LC

[56] References Cited

U.S. PATENT DOCUMENTS

2,921,129  1/1960  Marks ........................... 350/160 LC

*Primary Examiner*—Marshall M. Curtis
*Attorney, Agent, or Firm*—Cushman, Darby & Cushman

[57] ABSTRACT

A display device comprising at least a pair of electrodes chargeable to opposite polarities from each located relative to a background which provides a first degree of contrast when the electrodes are not charged and a second degree of contrast when the electrodes are charged, is provided with a visible pattern. The visible pattern is co-extensive with at least a portion of the electrodes so as to render the electrodes less discernible at low degree of contrast.

10 Claims, 3 Drawing Figures

DISPLAY DEVICE HAVING VISIBLE PATTERN

This invention relates to display devices in which display is effected as a consequence of a colour change produced in the region of an electrode surface. The invention relates particularly to display devices comprising a plurality of electrodes of one polarity.

BACKGROUND OF THE INVENTION

Display devices are known comprising at least a pair of electrodes of opposite polarity, one or more of said electrodes being positioned relative to a background which provides a first degree of contrast when the electrodes are electrically inactive and a second degree of contrast when the electrodes are electrically active. Usually, the first degree of contrast is low and the second degree high, but the background may be selected such that its appearance shows less contrast when the electrodes are electrically active than when they are electrically inactive.

Generally the less discernible an electrode is when its degree of contrast is low, the smaller is the likelihood of confusion arising between the display in that degree of contrast and the display in the higher degree of contrast. The discernibility of an electrode is a function of its sharpness of definition and of its degree of contrast with the background. We have now found that if the display device comprises a visible pattern the outline of an electrode may be lost in the pattern so that the electrode may become less discernible at low degree of contrast and hence the likelihood of confusion is diminished.

SUMMARY OF THE INVENTION

Accordingly the present invention provides a display device comprising at least a pair of electrodes chargeable to opposite polarities from each other located relative to a background, and a visible pattern, at least a portion of the said electrodes and the visible pattern being co-extensive, the said visible pattern maintaining electrical insulation between electrodes of different polarity from each other.

By display device we mean a device comprising at least a pair of electrodes disposed in a medium and a background; when the electrodes are charged to opposite polarities, a change occurs in the medium which change produces visible radiation or modifies the visible radiation absorption characteristics of the device so that the wavelength of the visible radiation transmitted or reflected by the device is different from the wavelength of the visible radiation transmitted or reflected by the device when the electrodes are not charged. The display device may be a charged particle transport device in which ions move in a gas, e.g. a gas discharge device; or in which ions move in a liquid, e.g. an electrochromic display device as disclosed in our German Patent Specification No. 2,606,056; and U.S. Application Ser. No. 658,537 or in which ions move in a solid, e.g. an electrochromic display device as disclosed in our copending UK Patent Application No. 28241/76; and U.S. application Ser. No. 813,420, filed July 6, 1977; or in which electrons move in a gas, e.g. a vacuum fluorescent device. Alternatively the display device may be a field effect device such as a liquid crystal display device or a ferroelectric display device.

Preferably the display device is an electrochromic display device. Our German Patent Specification No. 2,606,056 describes an electrochromic display device for use with a compatible electrochromic composition (i.e. a composition whose formulation is suitable for use in the said device — such compositions are described for example in UK Patent Specification No. 1,314,049 which corresponds to U.S. Pat. No. 3,712,709 and in U.S. Pat. No. 3,806,229) comprising working and counter electrodes, one or more of said electrodes being positioned relative to a background which provides a first degree of contrast for an electrode having no deposited material and a second degree of contrast for an electrode having deposited material thereon. Usually, the first degree of contrast is low and the second degree high, but the background may be selected such that its appearance shows less contrast with the deposit-carrying electrode than with the deposit-free electrode. Unless otherwise specified, for convenience both the working and counter electrodes, whether single or multiple, will be referred to as 'electrodes' and the electrodes comprising the display, whether working or counter electrodes of both, will be referred to as 'display electrodes'.

Preferably the background and the electrodes are opaque but we do not exclude the possibility that they may be translucent or transparent. Thus the device may be viewed by either reflected or transmitted light. The display device of the invention may comprise one or more pairs of electrodes of opposite polarity from each other, some or all of which may be electrically linked so that such linked electrodes are simultaneously energised or de-energised - thereby effectively forming a single, segmented, electrode. Where a plurality of such pairs of electrodes are employed preferably all the electrodes are co-extensive with at least a proportion of the pattern although we do not exclude the possibility that only a proportion of the electrodes are co-extensive with at least a portion of the pattern.

The term background, as used herein, is not limited to a component which is located necessarily in a different plane from the electrodes or which is necessarily continuous. Thus a display device may comprise display electrodes and a background in the same plane, both being formed upon a substrate. This particular disposition is particularly convenient since if the background itself is conducting material it may be employed as an electrode, e.g. in an electrochromic display device it may be employed as a counter electrode, or as a lead to an electrode. In an electrochromic display device where the background or a portion thereof is a lead to a working electrode it will be appreciated that the lead is preferably insulated from the electrochromic composition, for example it may be coated with a layer of insulation to prevent deposition thereon. Preferably the insulation is transparent so that the leads cannot readily be discerned, although we do not exclude the possibility that the layer of insulation may bbe translucent or opaque, e.g. for aesthetic appeal.

The visible pattern preferably comprises lines which particularly preferably form a network. Preferably the lines comprising the network are parallel to at least a portion of the boundary of the electrodes and particularly preferably at least some of the lines form at least a portion of the boundary to the electrodes. A device comprising rectilinear electrodes and a rectilinear network is particularly preferred.

Within the term "line" we include gaps or discontinuities looking like lines at a working distance. While the lines may be continuous or discontinuous, discontinuous lines are often conveniently employed.

By the term "network" we mean lines not only in the pattern of a net but also a pattern in which, for example, intersection of all the lines does not occur. Thus we include in this term a pattern of parallel or non-parallel lines running only in one direction. The meshes of the net may be of any appropriate shape, they may be of regular or irregular shape. Regular shapes which may be employed include, inter alia circles, triangles, squares, hexagons, octagons, trapezoids, parallelograms and rhombuses. Simple experiment will readily reveal a suitable shape for any particular application.

The dimensions of the mesh and/or lines will be chosen as appropriate for any particular device, thus the meshes may range in area from 0.001 sq mm to 1000 sq cm and the width of the lines from $0.1\mu$ to 10 cm. Typically the area of the meshes lies in the range 0.01 sq mm – 10 sq cm and the width of the lines in the range $10\mu$ – 1 cm. It will be appreciated that the area of the meshes and of the electrodes need not be the same, the meshes may be larger or smaller than the electrodes. Simple experiment will readily reveal appropriate sizes of meshes and lines for any particular application.

The network may comprise a discrete entity or lines, drawn, painted or otherwise marked on or in the electrodes and/or background. Preferably the network comprises gaps or discontinuities in the electrodes and/or background, the bounding material effectively forming the edges of the gaps. Where the network is a discrete entity it may be superimposed above the electrodes or it may be in contact with the electrodes.

Where the network is a discrete entity in contact with the electrodes or is in the form of lines drawn, painted or otherwise marked on or in the electrodes it will naturally be such that if effectively electrically insulates electrodes of different polarity from each other although it may contain electrically conducting portions which electrically connect electrodes of similar polarity.

Where the device comprises electrodes and background in one plane the network preferably comprises gaps in the electrodes and background, and particularly preferably the gaps form the boundaries of the electrodes. Leads to an external electronic circuit may be in the said one plane, in which case it will be appreciated that the gaps do not completely sever the electrical pathway between the electrodes and the leads so that electrical contact is destroyed, i.e. the gaps forming the boundaries of the electrodes are discontinuous. Alternatively contact with an external circuit may be via leads in a different plane from the said one plane, in which case the gaps forming the boundaries of the electrodes may be continuous.

The working and counter electrodes in an electrochromic display device should not be immediately adjacent but should be separated laterally by at least 0.2 mm and preferably by at least 0.5 mm. Conveniently the background is immediately adjacent the working electrode. Where the counter electrode is immediately adjacent the working electrode it is preferably coated with an insulating glaze.

Where opaque electrodes and background are employed e.g. in a double faced display device, two networks i.e. one on each face of the device, are desirable though not essential.

The network may be preformed before incorporation into the device e.g. where the network is a fibre mesh which may be self-supporting or supported in a matrix. The network may be formed in situ on the preformed device e.g. by painting a network or opaque insulating glaze on the electrodes and background or by etching a network in the electrodes and background. Preferably however the network, the electrodes and the background are generated simultaneously in one plane e.g. by metal deposition through an appropriate mask onto a suitable substrate or by screen printing or by a photo-etching technique. Where fine lines are required generation of the electrodes, background and network by the photo-etching technique is particularly preferred.

BRIEF DESCRIPTION OF THE DRAWINGS

One embodiment of the invention is illustrated in the accompanying drawings which show diagrammatically an example of one disposition of components and network in a typical device according to the invention.

In FIG. 1 the electrodes have a low degree of contrast with the background and in FIG. 2 the electrodes have a high degree of contrast.

DETAILED DESCRIPTION OF THE INVENTION

Figure 1:
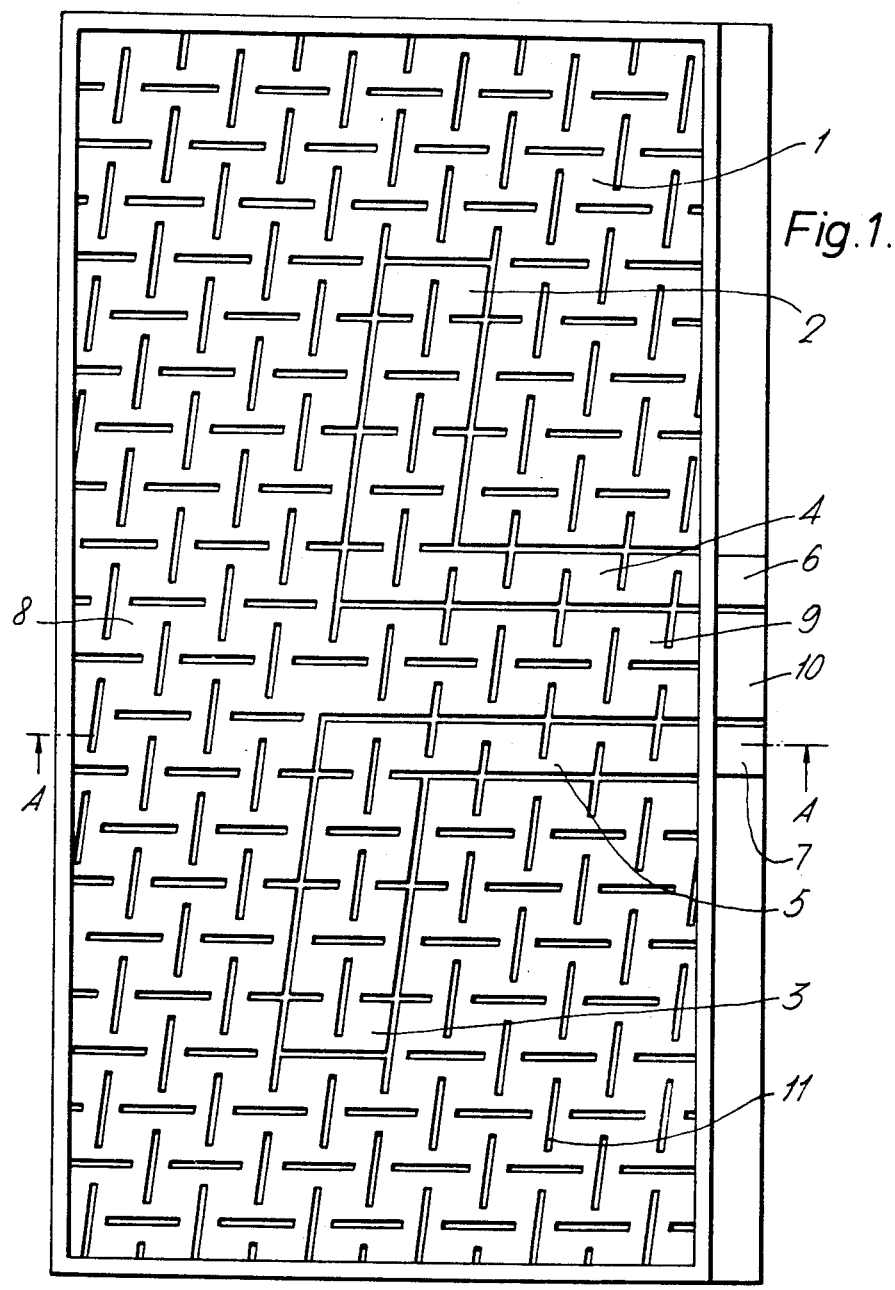
FIGS. 1 and 2 show plan views of a typical display device.

A thin layer of metal 1, e.g. gold of the order of 0.1 to 1 $\mu$m thick, in the form of working electrodes 2, and 3 of appropriate shape, with associated leads 4 and 5 and contact pads 6 and 7 thereto and a counter electrode 8 with a lead 9 and a contact pad thereto 10 with suitably spaced gaps 11 to form a network, is deposited e.g. by screen printing on an insulating substrate typically glaze 12 coated aluminium 16. A layer 13 of clear colourless ceramic glaze provides an insulating layer over the leads to the working electrode so that no deposition occurs thereon, and over the portion of the counter electrode adjacent to the working electrode.

Figure 2:
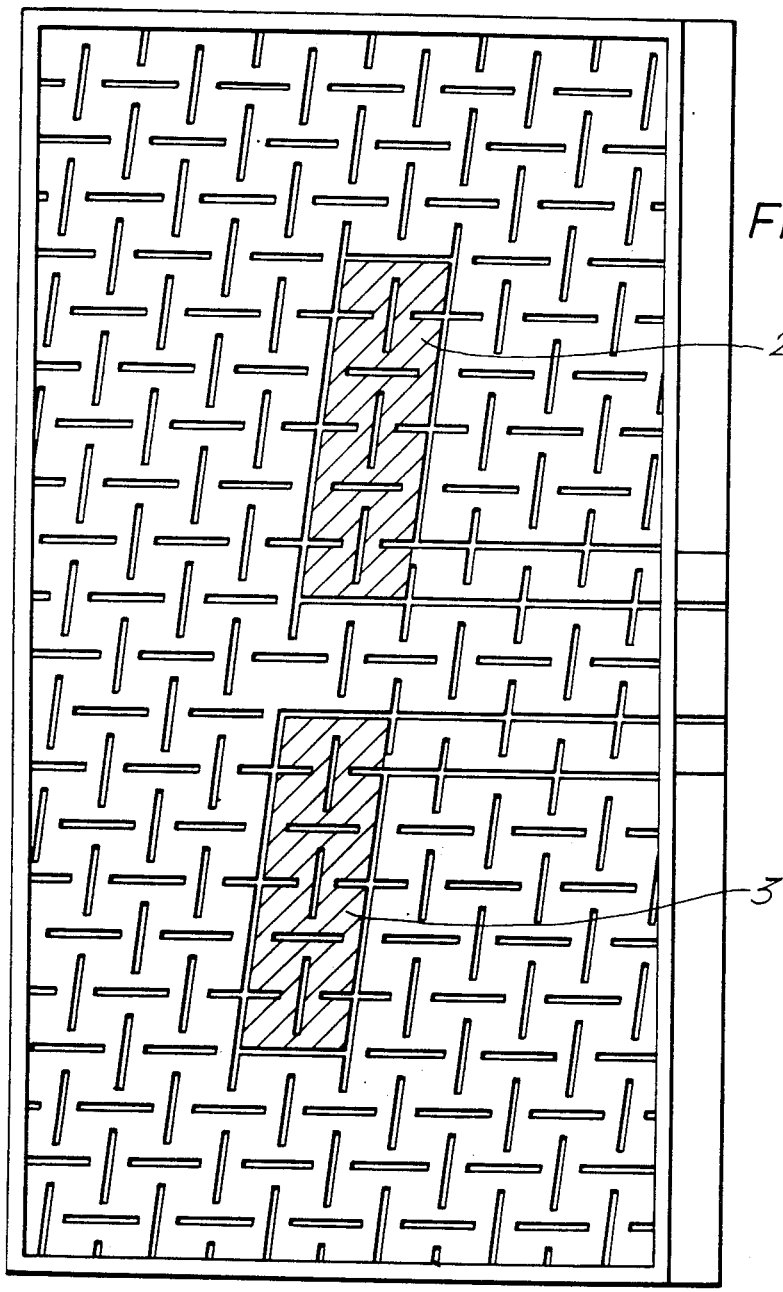
Figure 3:
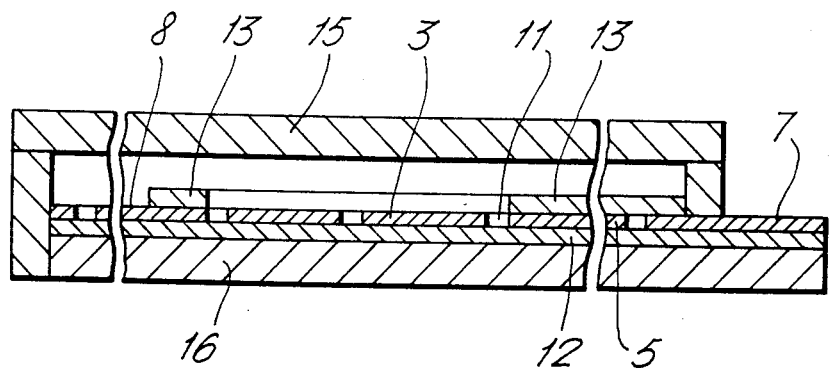
FIG. 3 is a diagrammatic cross sectional representation on the line AA of FIG. 1. The electrodes may, of course, be arranged otherwise than as shown, e.g. in the conventional digital distribution.

A glass or ceramic housing 14 is attached to the substrate by means of a suitable adhesive, e.g. solder glass, and is covered with a transparent cover 15. The electrochromic composition is contained in the cavity 16 of the housing. In use, the contact pads are external to the frame and can be connected to appropriate electronic circuitry. When not energised the display electrodes will not be visible; upon production of a contrasting colour in the region of the working electrode a display is visible as shown in FIG. 2.

The invention is illustrated by the following Examples.

EXAMPLE 1

A display unit was built up based upon an alumina substrate of dimensions 25 × 10 × 0.5 mm as follows:

A uniform transparent glaze (79 T5 in medium 65/101 ex. Blythe Colours, Stoke-on-Trent) coat 10$\mu$ thick was screen printed on to the alumina base and fired at 950° C. for 30 minutes.

An electrode arrangement, network, leads and contact pads were then screen printed through a figured screen on to the glaze coat using gold 6340 resinate (ex. Engelhardt) and fired at 850° C. to give a component thickness between 0.1 and 0.5$\mu$.

A dielectric glaze was next screen printed to cover the leads to the working electrodes and the portion of the counter electrodes within 1 mm of the working electrodes (glaze 11 H34 in 63/2 solvent (ex. Blythe Colours)) and fired at 750° C.

The device was completed by sealing on to the substrate an alumina gasket surrounding the counter electrode area but not the contact pads to form the housing which was closed by application of a glass cover, sealed with solder glass screen printed on to the cover and fired at 500° C. to seal. The housing cavity was filled through a hole in the gasket with an electrochromic electrolyte disclosed in our UK patent specification No. 1,314,049. The hole in the gasket which was then sealed with a polymeric plug.

EXAMPLE 2

A display unit was built up based upon an alumina substrate of dimensions 25 × 10 × 0.5 mm as follows:

A uniform transparent glaze (79 T5 in medium 65/101 ex. Blythe Colours, Stoke-on-Trent) coat $10\mu$ thick was screen printed on to the alumina base and fired at 950° C. for 30 minutes.

An overall uniform layer of gold was then screen printed on to the glaze coat using gold 6340 resinate (ex. Engelhardt) and fired at 850° C. to give a component thickness between 0.1 and $0.5\mu$.

An overall uniform layer of an organic photo-resist (Shipley AZ 111) was applied to the surface of the gold and dried. The layer of photo-resist was then illuminated for a few minutes by low powered UV radiation through a negative of the network. The exposed portions of the layer of photo-resist were removed in caustic soda solution and the portions of the gold layer which were uncovered were removed in an aqueous potassium iodide/iodine solution to leave a network of gaps in the gold layer. The unexposed portions of the photo-resist were then dissolved in methyl ethyl ketone and the device was completed as in Example 1.

EXAMPLE 3

A display unit was built up based on an alumina substrate of dimension 25 × 10 × 0.5 mm as follows:

Dots of transparent glaze (79 T5 in medium 65/101) $10\mu$ thick were screen printed on to the alumina base and fired at 1050° C. for 15 minutes. The position of the dots corresponded to the position at which the electrodes were to be generated.

Strips of bright gold (6340 ex. Engelhard) between 0.1 and $0.5\mu$ thick were screen printed on to the alumina base. Each strip extended from an edge of the base to cover one of the dots. The gold was fired at 850° C.

Two coats of a dielectric glaze (11 T11 in medium 63/2 ex. Blythe Colours) were applied to the base and fired at 850° C. for 5 minutes. Only the gold covering the dots remained exposed after this treatment.

An electrode arrangement, and network were then screen printed through a figured screen onto the glaze coat using bright gold GBC 3435/S (ex. Blythe Colours Ltd.) and fired at 650° C. The strips of gold contacted the gold layer above the dots of glaze and formed leads to the electrodes. The electrode arrangement and network were designed to given an electrically neutral area extending approximately 1 mm laterally from each of the electrodes.

The device was completed as in Example 1.

It will be appreciated that alternative materials may be employed in the fabrication of the devices of the invention, as may alternative techniques. Thus, although we have specifically mentioned screen printing, other methods of laying down materials in accurately controllable fashion, particularly in accurate register, may be used. For example, as an alternative to screen printing we may use litho, letterpress or gravure printing techniques.

What I claim is:

1. A display device comprising at least a pair of electrodes chargeable to opposite polarities from each other, said electrodes having a first degree of contrast when charged and a different degree when not charged, said electrodes located relative to a background, and means for forming a regular visible pattern comprising insulating sections extending over at least a portion of the said electrodes and the background to reduce the discernability of said electrodes in one of said degrees of contrast, the said visible pattern maintaining electrical insulation between electrodes of different polarity from each other.

2. A display device as claimed in claim 1 in which the electrodes and the background are opaque.

3. A display device as claimed in claim 1 in which the visible pattern comprises a plurality of lines.

4. A display device as claimed in claim 3 in which the lines are discontinuous.

5. A display device as claimed in claim 3 in which the lines form a network.

6. A display device as claimed in claim 5 in which the lines of the network are parallel to at least a portion of the outline of the electrodes.

7. A display device as claimed in claim 6 in which at least some of the lines form a boundary to the electrodes.

8. A display device as claimed in any claim 5 in which the network is substantially rectilinear.

9. A charged particle transport display device as claimed in claim 3 in which the electrodes and background are coplanar.

10. A charged particle transport display device as claimed in claim 9 in which the lines are gaps or discontinuities in the electrode and/or background.

* * * * *